Aug. 3, 1965 B. MAILLARD 3,198,075
AUTOMATIC FIREARM WITH A RECOILING BARREL
Filed May 28, 1962 12 Sheets-Sheet 2

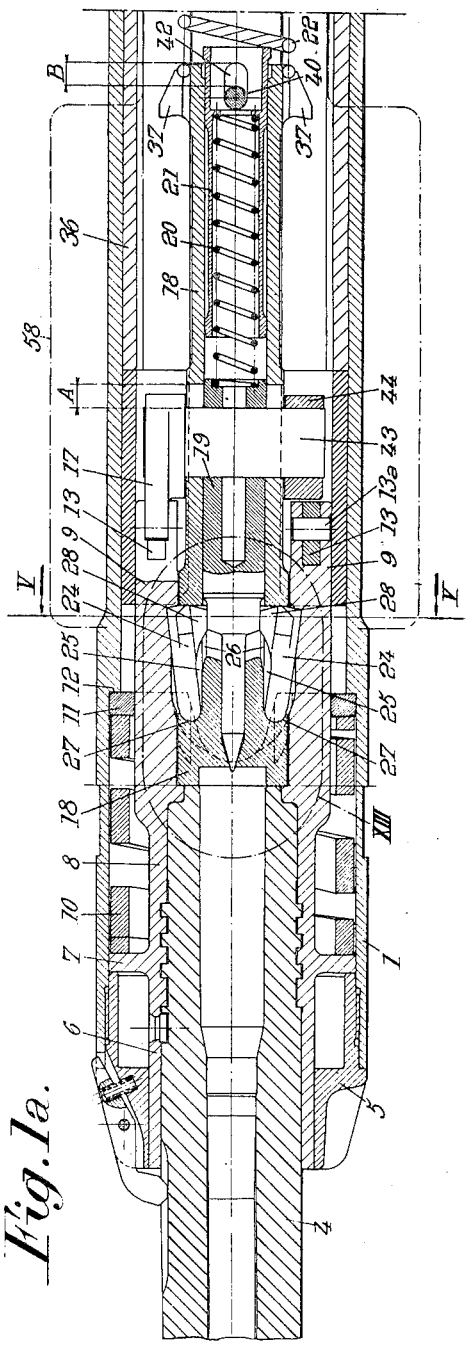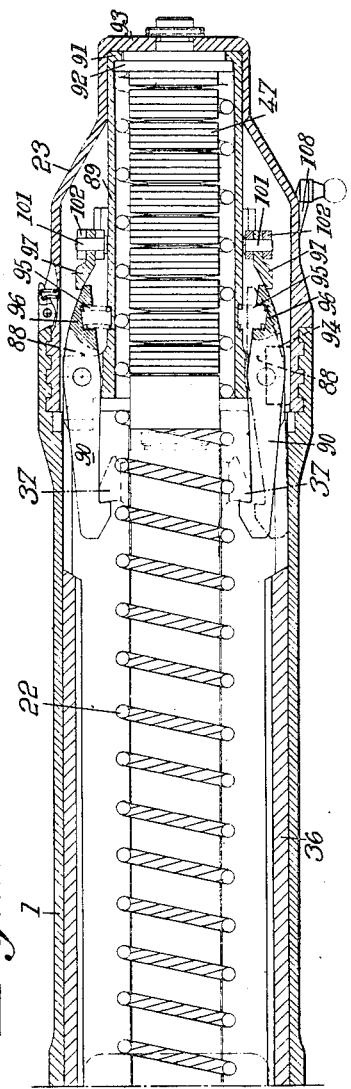

Aug. 3, 1965     B. MAILLARD     3,198,075
AUTOMATIC FIREARM WITH A RECOILING BARREL
Filed May 28, 1962     12 Sheets-Sheet 3
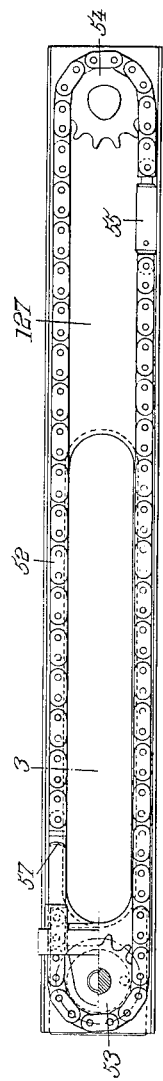
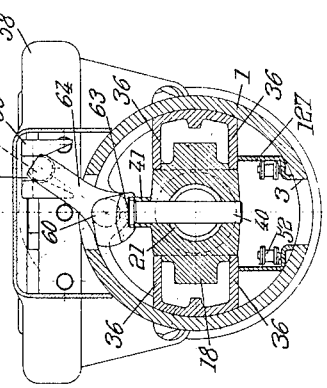
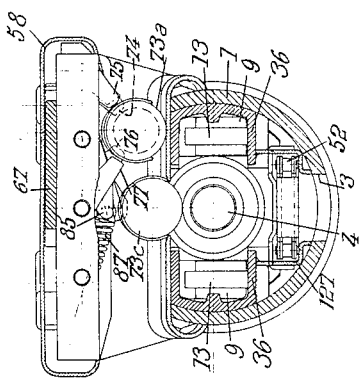

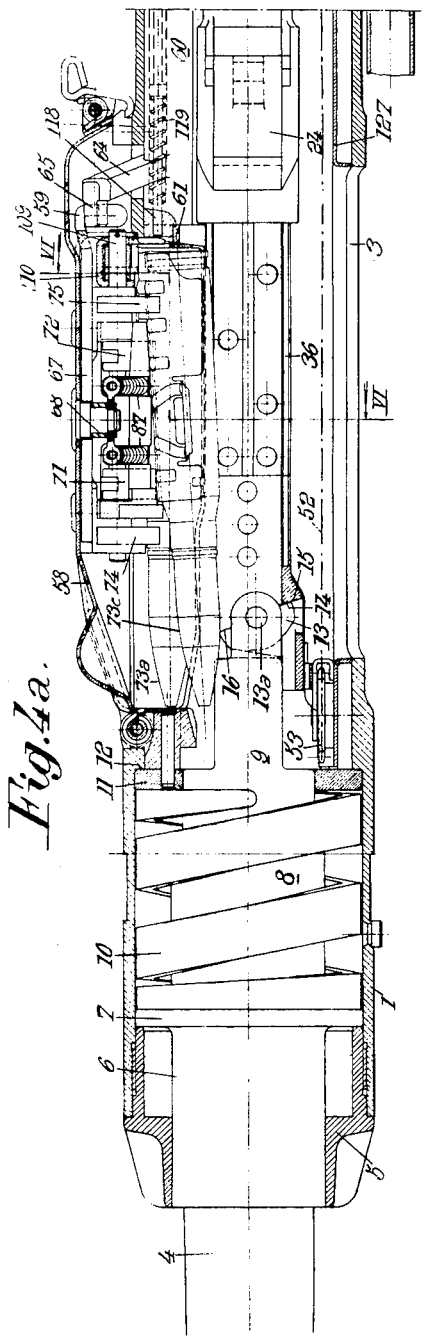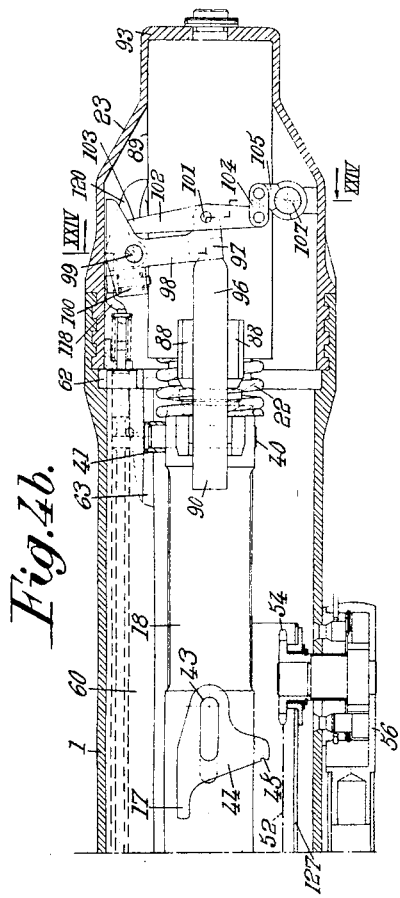

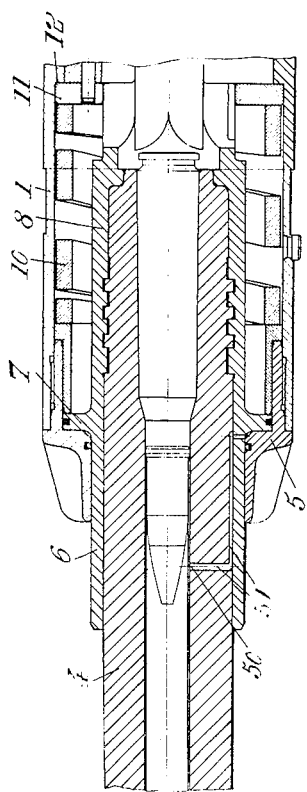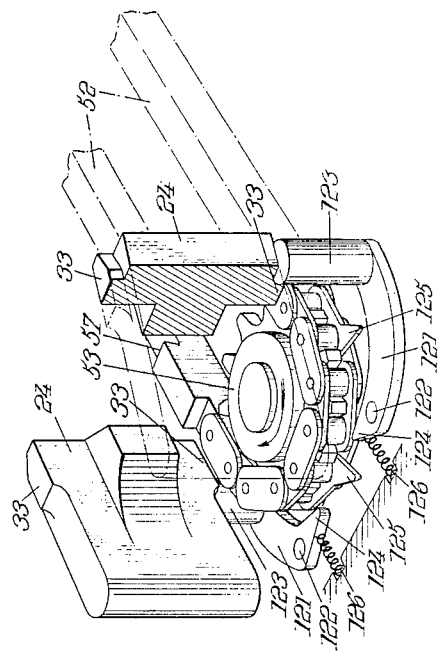

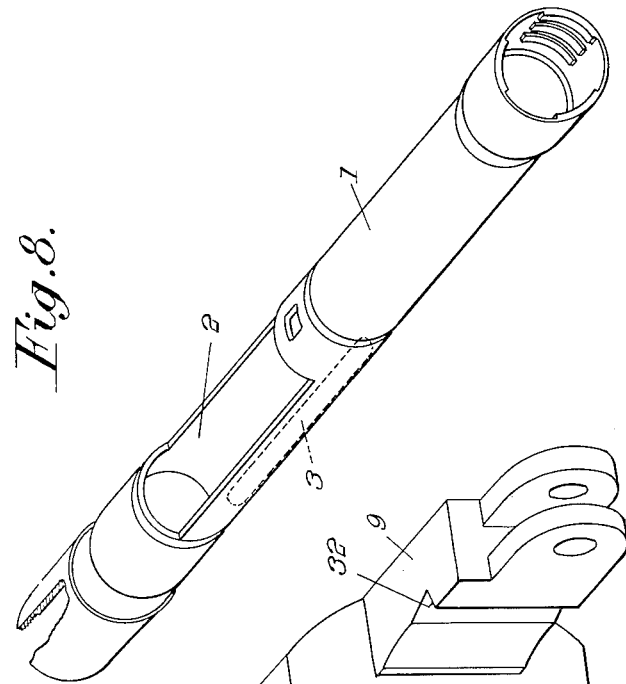
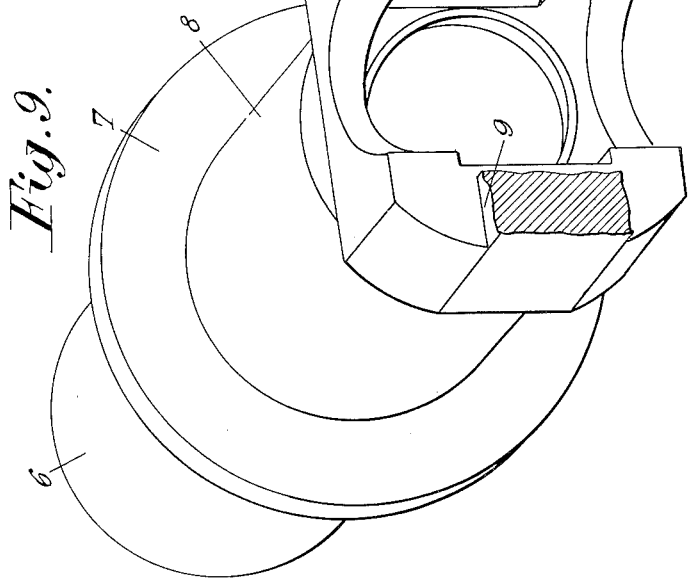

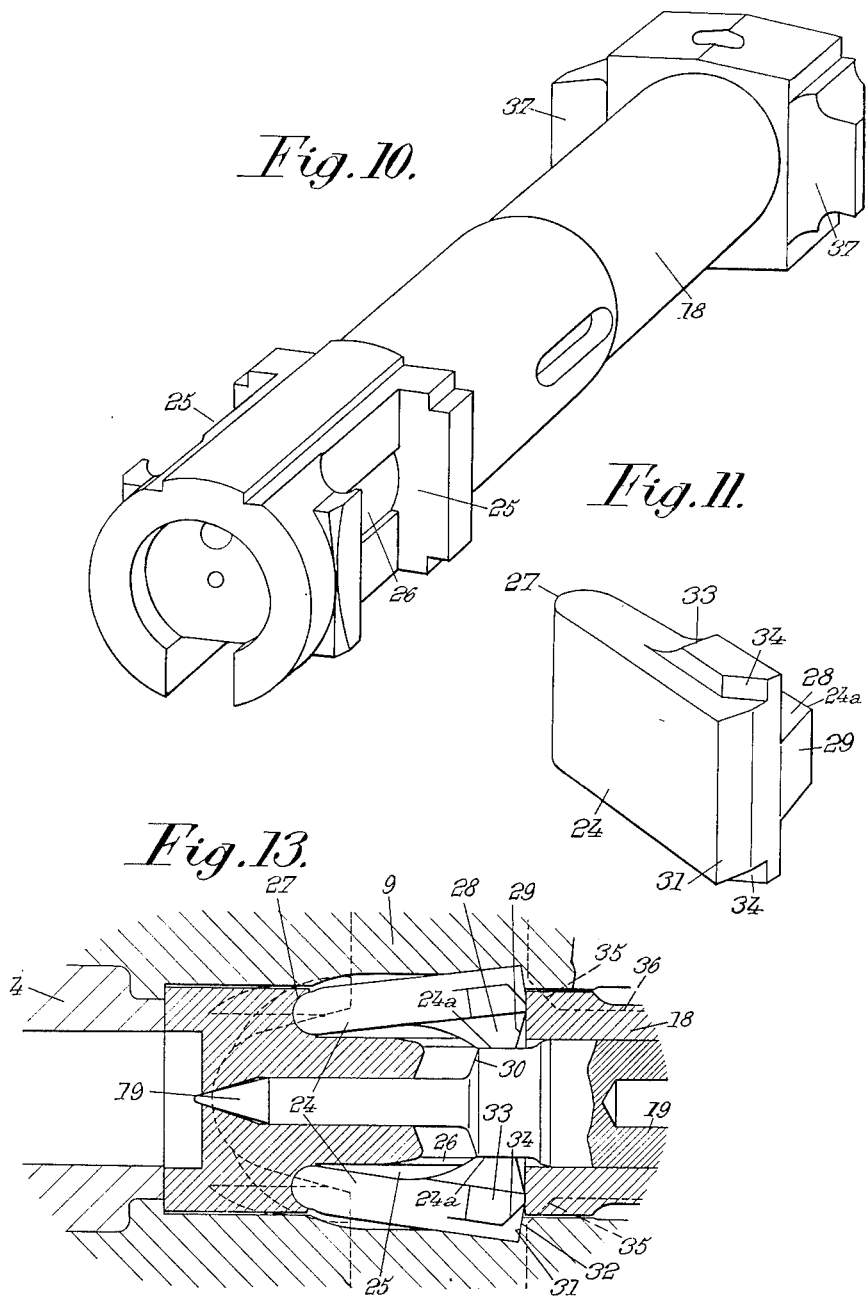

Aug. 3, 1965  B. MAILLARD  3,198,075
AUTOMATIC FIREARM WITH A RECOILING BARREL
Filed May 28, 1962  12 Sheets-Sheet 12
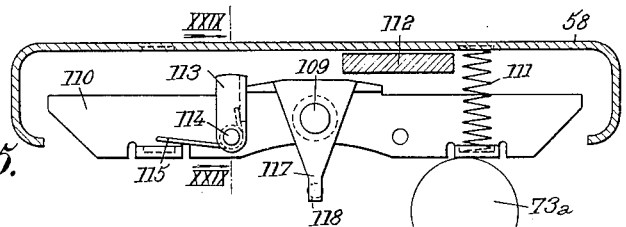
Fig.25.
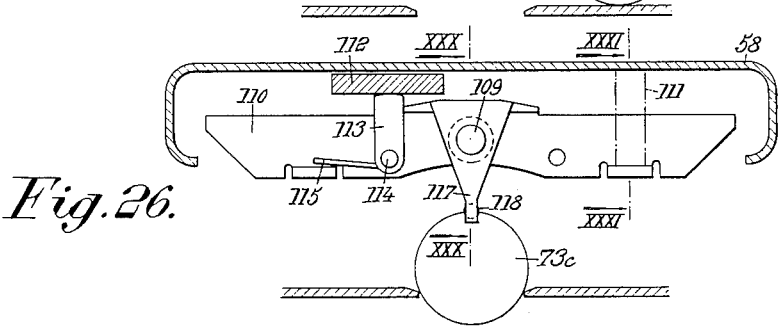
Fig.26.
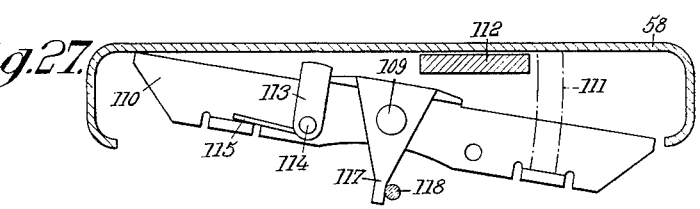
Fig.27.
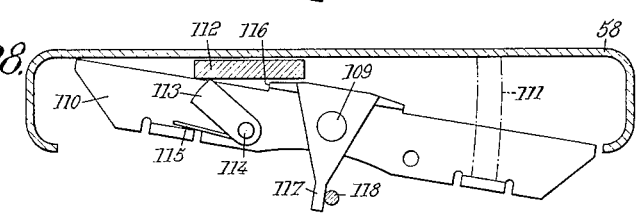
Fig.28.
Fig.29. Fig.30.  Fig.31.
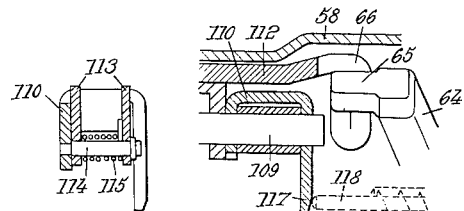
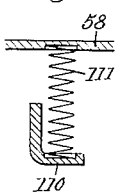

United States Patent Office 3,198,075
Patented Aug. 3, 1965

3,198,075
AUTOMATIC FIREARM WITH A RECOILING BARREL
Bernard Maillard, Geneva, Switzerland, assignor to Brevets Aero-Mecaniques S.A., Geneva, Switzerland, a society of Switzerland
Filed May 28, 1962, Ser. No. 198,195
Claims priority, application Luxembourg, June 2, 1961, 40,215; June 21, 1961, 40,296
6 Claims. (Cl. 89—33)

The present invention relates to automatic firearms in which the barrel recoils with respect to a casing fixed to the firearm support (gun mount), such firearms comprising a breechblock body movable, with a reciprocating rectilinear translatory motion, in the casing, which casing is provided in its upper portion with an opening for introduction of the cartridges by means of a belt feed mechanism, the lower portion of said casing being provided with a passage for the ejection of the empty cartridge cases, a return spring being interposed between the breechblock body and the rear of the casing.

The object of this invention is to provide a firearm of this type having an economical and compact construction and where the various mechanisms are suitably protected.

The firearm according to this invention is characterized by the fact that the casing is of cylindrical shape coaxial with the barrel and is provided with inner slideways for supporting and guiding the breechblock body arranged in such manner as to leave inside the casing, respectively above and below the breechblock body, spaces of elongated shape in which are housed a device for actuating the belt feed mechanism and a device for cocking the gun, each of said two devices cooperating with the breechblock body during at least most of the reciprocating translatory motion of this breechblock body.

Advantageously the device for actuating the belt feed mechanism comprises an elongated rotary cam turning about an axis parallel to the barrel axis and which is actuated by the breechblock body during its reciprocating displacements in the casing.

The device for cocking the gun advantageously comprises an endless chain having two parallel portions disposed on either side respectively of the ejection passage.

Preferred embodiments of this invention will be hereinafter described with reference to accompanying drawings given merely by way of example, and in which:

FIG. 1a is a horizontal section of the front portion of the mechanism of a machine gun made according to this invention;

FIG. 1b is a similar view of the rear portion of the mechanism of this machine gun, this figure forming, together with FIG. 1a a complete horizontal section of the machine gun;

FIG. 2a is a vertical section of the front portion of the mechanism of a machine gun made according to this invention;

FIG. 2b is a similar view of the rear portion of the mechanism of this machine gun, this figure forming, together with FIG. 2a, a complete vertical section of the machine gun;

FIG. 3 is a view of the portion of the mechanism seen in the direction of the arrows III—III of FIGS. 2a and 2b;

FIGS. 4a and 4b are views similar to FIGS. 2a and 2b, respectively, but with some elements shown in elevation;

FIG. 5 is a section view on the line V—V of FIG. 1a;

FIG. 6 is a section view view on the line VI—VI of FIG. 4a;

FIG. 7 is a section view on the line VII—VII of FIG. 2a;

FIG. 8 is a diagrammatic perspective view of the casing forming the framework of the machine gun, this casing being seen from the rear;

FIG. 9 is a diagrammatic perspective view of an element of this machine gun, hereinafter called "forked sleeve," this element being seen from the rear;

FIG. 10 is a diagrammatic perspective view of the breechblock body of the machine gun, this breechblock body being seen from the front;

FIG. 11 is a diagrammatic perspective view of one of the members for locking the breechblock body, this locking member being seen from the rear;

FIG. 12 is a part view showing in vertical section a modification of the mechanism of FIG. 2a;

FIG. 13 is an enlarged view of the portion of FIG. 1a, surrounded by the dot-and-dash line XIII;

FIG. 24 is a vertical cross-section on the line XXIV—XXIV of FIG. 4b;

FIGS. 25, 26, 27 and 28 are vertical cross-sections on the line XXV—XXV of FIG. 14, these views corresponding to four different positions, respectively, of the belt feed mechanism.

FIG. 29 is a section view on the line XXIX—XXIX of FIG. 25;

FIG. 30 is a section view on the line XXX—XXX of FIG. 26;

FIG. 31 is a section view on the line XXXI—XXXI of FIG. 26;

FIG. 32 is a perspective view of the mechanism for retracting the locking members.

Figure 14:
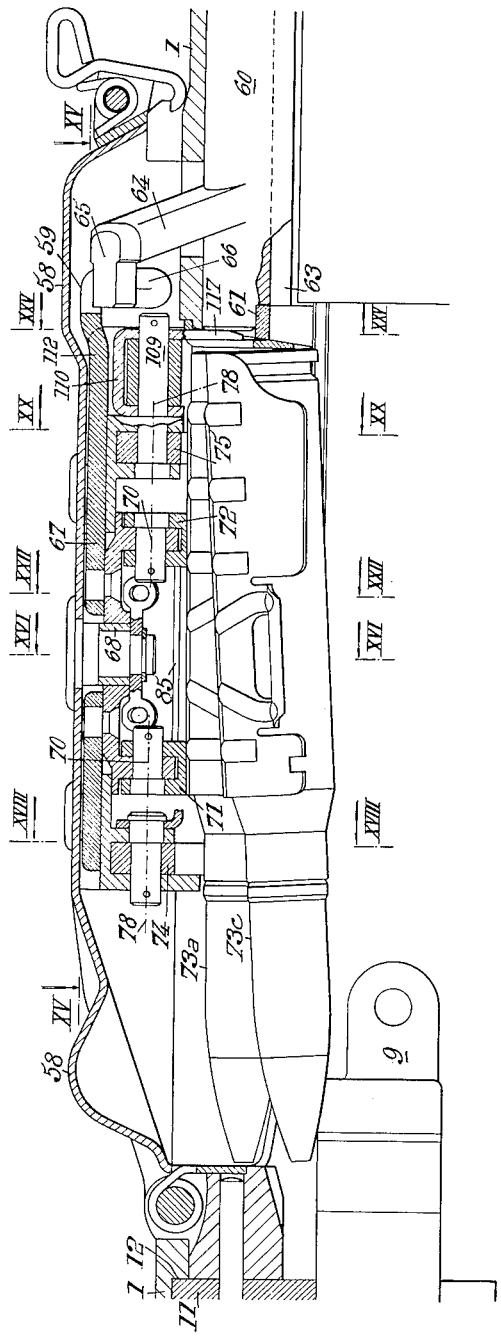
FIG. 14 is a vertical longitudinal section on an enlarged scale of the belt feed mechanism of the machine gun.
Figure 15:
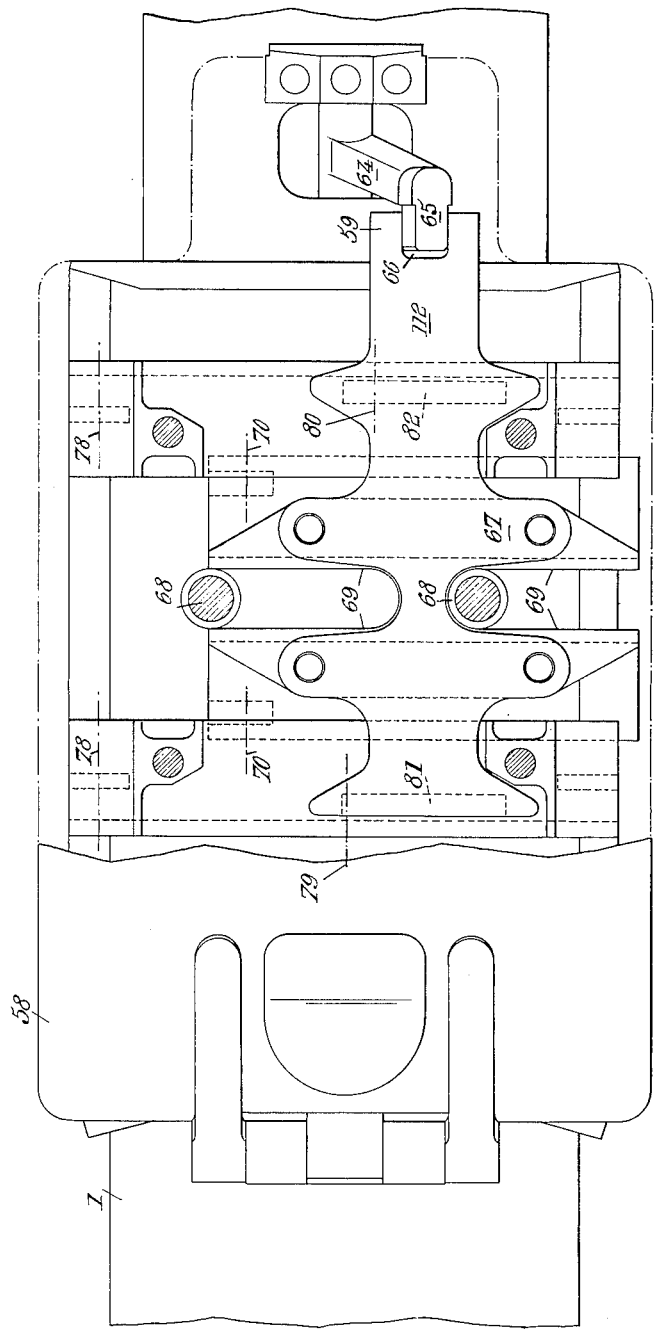
FIG. 15 is a horizontal section of this last mentioned mechanism on the line XV—XV of FIG. 14.
Figure 16:
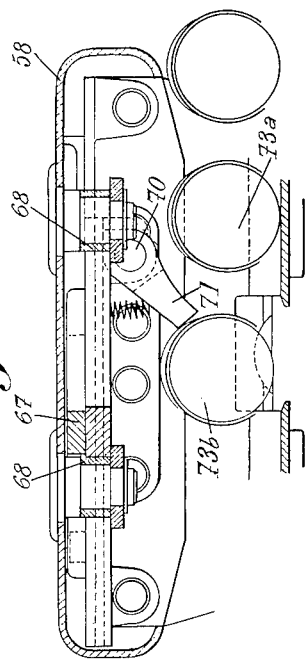
FIGS. 16 and 17, are cross-sections of this belt feed mechanism on the line XVI—XVI of FIG. 14 corresponding to two different positions of this mechanism respectively.
Figure 17:
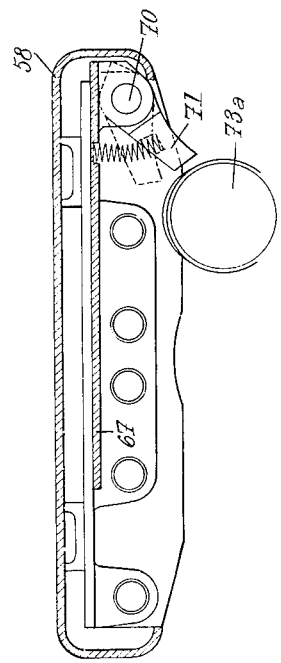
Figure 18:
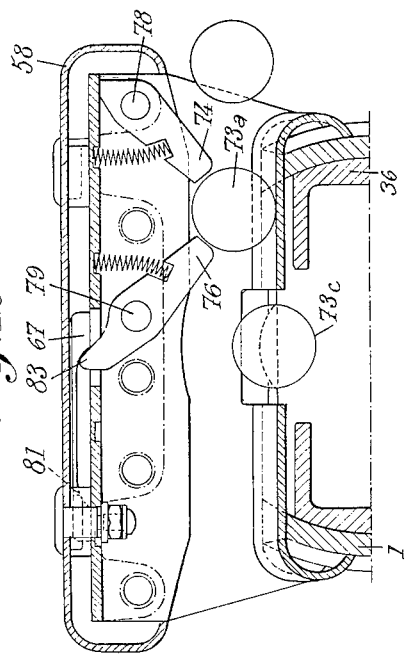
FIGS. 18 and 19 are cross-sections of this belt feed mechanism on the line XVIII—XVIII of FIG. 14 corresponding to two different positions of this mechanism respectively.

The drawings relate to a machine gun of 20 mm. caliber.
The framework of this machine gun consists of a tubular casing 1 (FIG. 8) forming the breech casing and of circular cross-section and of substantially the same diameter over its whole length (the external value of this diameter ranging from 110 to 120 mm.). This casing is provided in its upper portion with an opening 2 (FIG. 8), adapted to receive the belt feed mechanism, and in its lower portion with a passage 3 for the ejection of the empty cartridge cases. This shape of casing 1 (which constitutes a kind of tubular girder) gives a maximum rigidity for a given weight of metal.

Casing 1 may be made from a tubular blank, for instance of drawn and treated steel. It may also be made by means of two tube halves assembled for instance by welding along their generatrices. In both cases machining of the casing may be effected essentially by boring and turning. Thus the manufacture of this casing is particularly simple and economical.

Casing 1 supports the rear portion of barrel 4, disposed coaxially therein, with the interposition of a recoil buffer device. In this casing is further mounted the breech device with its locking means and also, on the one hand, at the rear, the breechblock buffer mechanism and on the other hand, laterally of these devices, those for driving the belt feed mechanism and for cocking the gun.

The front end of casing 1 is provided with screw threads adapted to receive a nut 5, the bore of which serves to guide a sleeve 6 in which is fixed the rear end of barrel 4 (this sleeve 6 is visible in perspective view in FIG. 9). Of course the gun barrel 4 may be fixed in removable manner in said sleeve 6 for instance by a bayonet fixation.

Sleeve 6 comprises, at the front thereof, a cylindrical portion adapted to slide in the bore of nut 5, then, at the rear of this portion, an annular flange 7 adapted to slide along the inner wall of casing 1, a portion 8 of general cylindrical shape, surrounding the rear end of barrel 4 and, finally, on the right and on the left respectively, two arms 9 forming a fork, these arms being such that the breechblock body can pass between them as it will be hereafter described.

A recoil buffer spring 10 is inserted between annular flange 7 and the front end of a rear abutment 11 bearing against a shoulder 12 of casing 1. This annular abutment 11 consists of a ring adapted to guide the rear portion of forked sleeve 6 so that barrel 4 fixed in this sleeve can slide longitudinally with respect to casing 1.

The inner wall of this ring 11 comprises flat portions adapted to cooperate with sleeve 6 so as to prevent it from turning about its axis during its reciprocating longitudinal movements. This ring 11, therefore resists to the angular moments resulting from the fact that the projectile is rotated about its axis in barrel 4 due to the riflings of this barrel.

Each of the arms 9 is provided, at its rear end with a lever 13 (FIG. 4a), pivoted to said arm 9 about a transverse horizontal pin 13a.

Each of these levers 13 comprises at its lower end, i.e. below arm 9, a projection 14, and, at its upper end, i.e. above arm 9, a projection 16.

Projection 14 is adapted to come, after for instance 20% of the recoil stroke of barrel 4, into contact with an abutment 15 carried by an element fixed with respect to casing 1, this element being the breechblock guide 36 (which will be hereinafter described).

When lever 13 is pivoted, due to the fact that said lower projection 14 thereof has been stopped by said abutment 15, the upper projection 16 of lever 13 pushes back a finger 17 (FIGS. 1a and 4b) at a speed equal to twice that of the recoil movement of barrel 4 if projection 14 and 16 are both at the same distance from pin 13a.

The breechblock (FIG. 10) essentially comprises a breechblock body 18 including a front head and a rearward tail of general tubular shape in which is slidably mounted, with a limited amplitude of displacement A (as shown by FIG. 1a) a firing pin element 19 serving also to lock the breechblock in breech closing position.

This element 19 is pushed toward the front with respect to breechblock body 18 by a spring 20 the rear end of which bears against the end wall of a sleeve 21 also slidable longitudinally, as it will be hereinafter described, in breechblock body 18, with a limited amplitude B.

Firing pin 19 is arranged to have the following functions (a) When breechblock body 18 is nearing the end of its frontward stroke, a further frontward displacement of said firing pin 19, under the effect of inertia and also under the thrust of spring 20, first causes breechblock body 18 to be locked in tight contact with the rear edge of barrel 4 (by the cooperation therewith of the surfaces 24a of locking members 24 pivotally carried by said breechblock body 18, FIG. 13, to be hereinafter fully described) between the arms of 9 of sleeve 6, and then causes the cartridge present in the cartridge chamber of barrel 4 to be fired;

(b) When the shot has been fired, barrel 4, sleeve 6 rigid therewith and breechblock body 18 move rearwardly under the effect of the recoil. Breechblock body 18 is kept against the rear face of barrel 4 by locking members 24, as above stated. Firing pin 19 is first pushed rearwardly by breechblock body 18 and moves together with it. Then, when the ends 14 of levers 13 (pivoted at 13a on arms 9) strike abutments 15 fixed with respect to casing 1, the other ends 16 of said levers 13 strike fingers 17 rigid with firing pin 19 thus causing it to move toward the rear at a speed equal to twice that of arms 9 and breechblock body 18. Firing pin 19 thus causes locking members 24 to be released so that they can subsequently retract toward the middle plane of the gun as a result of the cooperation of the faces 34 of these locking members 24 with oblique surfaces 35 which will be hereinafter described.

Breechblock body 18 is then pushed rearwardly through the action of firing pin element 19 and also by the thrust of the residual pressure of the powder gases acting on the rear end of the empty cartridge case, and this against the action of a return spring 22 the rear end of which is housed in a tubular cap 23 which closes casing 1 at the rear thereof, where it is secured, for instance, by bayonet fixation means. This cap 23, which will be hereinafter called "back block" carries abutment means for the rear end of return spring 22.

The two breechblock body locking members 24 (FIGS. 11 and 13) are disposed on either side, respectively, of the general plane of symmetry of breechblock body 18, in respective recesses 25 which communicate together through an opening 26 extending through said breechblock body 18.

The rounded front edges 27 of said locking members 24 engage the front walls of said recesses 25.

Each of these locking members 24 comprises the following portions:

(a) On the inner side, a central projection 28, extending toward the inside of breechblock body 18 and passing through the corresponding opening 26; said projection 28 has a locking surface 24a adapted to fit against one of the side walls of firing pin element 19, as shown by FIG. 13; furthermore said projection 28 has an oblique face 29 adapted to cooperate with a corresponding face 30 of firing pin element 19 so as to push locking member 24 outwardly when element 19 begins to move in the frontward direction with respect to breechblock body 18 supposed to be applied against the rear edge of barrel 4;

(b) On the outer side, an inclined face 31 adapted, when locking member 24 is driven outwardly by the cooperation of faces 29 and 30, to bear against a face 32 provided in the corresponding arm 9 of sleeve 6; and (c) Also on the outer side, but carried by at least one projection 33 located above said face 31, face 34 capable, when, after firing of a cartridge, the whole of barrel 4, sleeve 6 and body 18 has moved rearwardly with respect to casing 1, for instance 40% of its recoil stroke, of striking oblique surface 35 carried by the breechblock guide 36, so as to move locking member 24 into retracted position, said breechblock guide 36 then keeping locking member 24 in said retracted position during the remainder of the rearward movement of breechblock body 18.

From this time on, since breechblock body 18 and sleeve 6 are no longer locked together, sleeve 6 is stopped by spring 10 whereas breechblock body 18 keeps moving toward the rear.

The cooperating faces 31 and 32 have an inclination with respect to the direction of the efforts transmitted from body 18 to each of the locking members 24 such that, account being taken of the relative friction coefficient of the materials of locking member 24 (face 31) and of breechblock body 18 (face 32), these faces ensure an irreversible bearing of breechblock body 18 on sleeve 6 whatever be the intensity of these efforts. Thus, locking member 24 can be retracted only by the cooperation of the faces 34 of said locking member with the oblique surfaces 35 carried by the breechblock guide 36, and this cooperation of faces 34 and 35 takes place only when the whole of elements 4, 6, 18 has moved towards the rear over a substantial distance (for instance 40% of the rearward stroke of the breechblock body).

This arrangement therefore prevents any accidental release of the breechblock in case of rebounding of firing pin 19. On the other hand, the fact that the locking members 24 must operate in an irreversible manner determines a very small inclination of these members with respect to a plane perpendicular to the axis of barrel 4, whereby the thrusts exerted transversely on the arms 9 of forked sleeve 6 are relatively small and the friction between said arms and their guides in casing 1 is consequently also very small. Anyway, ring 11 constitutes an annular reinforcement opposing any radial deformation as the thrust of the locking members might tend to transmit to casing 1 and sleeve 6.

In addition to the above described locking means, breechblock body 18 carries the following elements:

(A) At the rear of the tubular tail portion of said breechblock body 18, in which the above mentioned sleeve 21 is slidable, catches 37 for engaging the sears, the front end of return spring 22 bearing against the rear faces of said catches 37;

(B) At the front of breechblock body 18, a pivoting extractor 38 (FIG. 2a) provided with a return spring held in position by a transverse pin;

(C) An ejector consisting of a rod 39 (FIG. 2a) parallel to the axis of barrel 4, guided in the breechblock body 18; the head, or front end of this rod 39 is located, when the breechblock is closing the breech, opposite a point of the cartridge case rear edge, diametrically opposed to the extractor, so that said head of rod 39 can push this point of the cartridge case rear edge toward the front; the rear end of rod 39 is located opposite a point of the front edge of sleeve 21 so that when said sleeve moves frontwardly with respect to breechblock body 18 over the limited distance B, it pushes rod 39 in the frontward direction, thus causing ejection of the empty cartridge case through the ejection passage 3 provided in the wall of casing 1;

(D) Near the rear end of body 18, a transverse spindle 40 carrying at one of its ends, externally of said body 18, a roller 41 which, as it will be hereinafter explained, serves to operate the belt feed mechanism; spindle 40 is intended to limit the relative displacement of sleeve 21 with respect to breechblock body 18, and for this purpose it extends through slots 42 (FIG. 1a) provided in the wall of said sleeve 21, thus permitting the desired axial displacement B between sleeve 21 and breechblock body 18.

Finally breechblock body 18 and its firing pin 19 are assembled together, with the possibility of the desired longitudinal play A (FIG. 1a), by means of a transverse piece 43 fitted in the rear end of firing pin 19 and extending through a slot formed in the wall of breechblock body 18 and of a longitudinal dimension greater by A than the longitudinal dimension of said piece 43. The ends of this transverse piece 43 are fixed in the two respective branches of an arcuate part 44 extending under breechblock body 18 (FIGS. 1a and 4b). This part 44 carries, at the end of each of its branches, one of the above mentioned fingers 17 (intended to cooperate with the upper projections 16 of levers 13). The middle portion of part 44 forms a projection 45 (FIGS. 2a and 4b) adapted to cooperate with the gun cocking means which will be hereinafter described.

As shown by FIG. 2b, the removable back block 23 carries, fixed to its end wall 93 by a rod 46 a buffer spring 47 consisting of a multiplicity of Belleville washers mounted about said rod 46. This spring 47, which is given an initial compression, pushes in the frontward direction, against the enlarged end 48 of rod 46, an abutment 49 which may thus be moved resiliently in the rearward direction, when it is struck first by the rear edge of the sleeve 21 (which causes ejection of the empty cartridge case) then by the rear end of breechblock body 18. The rear portion of return spring 22 is wound around spring 47.

In order to increase, if necessary, the recoil energy, a recoil reinforcing device may be incorporated in the device for guiding barrel 4 with respect to the front portion of casing 1, as illustrated by way of modification in FIG. 12.

For this purpose a vent hole 50 provided in the barrel 4 collects powder gases which are conveyed through a conduit 51 into the chamber formed, inside the front end of casing 1, between the front face of annular flange 7 (carried by sleeve 6) and the rear face of nut 5. Thus, as soon as the projectile has moved past vent hole 50, gases from said gun barrel pass into said chamber and push back the recoiling parts with respect to casing 1. The recoil is thus increased without increasing the reaction of casing 1 upon its support (for instance a gun mount).

In order to permit of cocking the gun when its breech is closed and the breech case is locked with respect to sleeve 6 it is of course necessary first to move firing pin 19 rearwardly with respect to breechblock body 18 until the locking means have been released, and then further to move said firing pin rearwardly (together with the breechblock body 18 owing to transverse piece 43) until the sears engage the above mentioned catches 37.

For this purpose there is provided (FIGS. 2a, 2b, 3, 4a, 4b and 6) in the space existing, on the inside of casing 1, under breechblock body 18 and its spring 22, a cocking device consisting essentially of an endless chain 52 extending between two pinions 53 and 54 pivoted about axes located respectively ahead of said ejection passage 3 and near the rear of said casing 1. The position and the diameter of these pinions are such that the chain portions (supposed to be stretched by suitable means 55) run along the longitudinal walls of passage 3, while leaving this passage clear so that ejection of the empty cartridge cases can take place between these two portions of the chain.

The cocking device is mounted inside casing 1 on a removable frame 127, on which pinions 53 and 54 are journalled.

The rear pinion 54 may be actuated through external means, such as a pawl and ratchet lever 56 (FIG. 4b) having a reciprocating motion, so as to control the displacement of the chain in a given direction.

On the portion of the chain which is moving in the rearward direction in these conditions, there is provided a finger 57 (FIGS. 2a and 3) adapted to engage the projection 45 of part 44. The system is arranged in such manner that, when chain 52 is actuated by lever 56 in the above mentioned conditions finger 57 moves projection 45 from its front position to its rearmost position, where the breechblock is caught and held by the sears. When the first cartridge is fired, finger 57 is moved toward the front by projection 45, lever 56 having been detached from the rear pinion 54 through any suitable means.

Advantageously, there is combined with the cocking device above described a mechanism for retracting the locking members 24 so that the gunner is not compelled to pull barrel 4 and sleeve 6 rearwardly until said members 24 are retracted by contact of their faces 34 with the oblique surfaces 35 carried by the breechblock guides 36. As a matter of fact this displacement of barrel 4 and sleeve 6 would involve compressing the very strong buffer spring 10.

As shown by FIG. 32, the mechanism for retracting the locking members comprises two levers 121 pivoted about respective axes 122 parallel to the axis of pinion 53 and disposed slightly at the front thereof. Each of these levers 121 comprises a head 123 located at one end of the lever and a nose 124 projecting from the other end of said lever located on the other side of axis 122 from head 123. Two links of chain 52 are provided with lugs 125 toward which noses 124 are urged by springs 126 which tend to move heads 123 away from the projection 33 of locking member 24.

When it is desired to open the breech, chain 52 is pulled in the direction of the arrow of FIG. 32. This chain first drives firing pin element 19 rearwardly by means of finger 57 cooperating with the projection 45 carried by said firing pin element, this movement being effected over a distance such that locking members 24 are now free to retract inwardly. Then the lugs 125 of the chain come into contact with the noses 124 of levers 121 and cause these levers to pivot against the action of springs 126. The heads 123 of these levers come into contact with the projections 33 of locking members 24 and retract these members inwardly. Finally the clearance A (FIG. 1a), having been caught up, breechblock body 18 moves together with firing pin element 19 in the rearward direction until catches 37 are engaged by the sears which will be hereinafter referred to.

After such an operation, chain 52 is brought back into inactive position by breechblock body 18 when the first cartridge is fired. The movement of levers 121 produced by the mutual contact of noses 124 and lugs 125 during the return movements thereof takes place sufficiently early to prevent any contact of the heads 123 of levers 121 with the projections 33 of locking members 24 so that locking of the breechblock body can take place normally.

The machine gun is provided with a belt feed mechanism the frame 58 of which is fixed on casing 1 opposite and above the upper opening 2 provided in said casing 1. This belt feed mechanism is arranged in such manner as to cause the ammunition belt to move forward one step under the effect of the reciprocating movement imparted, for every cycle of operation of the breechblock, and therefore for every cartridge that is being fired, to a control head 59 disposed at the rear of the frame 58 of the belt feed mechanism.

In order to control this head 59, there is provided, in the space existing inside casing 1 above the zone where breechblock body 18 is moving and rearwardly of the rear end of opening 2, an oscillating elongated cam 60 (FIGS. 2a, 2b) consisting of a rod extending parallelly to the axis of barrel 4 (but at the rear thereof) and supported at its respective ends by two bearings 61 and 62 carried by casing 1 respectively just behind the rear end of opening 2 and in the rear portion of casing 1. This cam 60 is provided with a helical groove 63 extending over most of its length, this groove cooperating with the above mentioned roller 41 (journalled at the upper end of transverse spindle 40 fixed to the rear portion of breechblock body 18) in such manner that when breechblock body 18 moves rearwardly in respect to casing 1 (feed stroke) roller 41, engaged in groove 63, causes cam 60 to turn through a given angle, the inverse rotation taking place when the breechblock body moves back toward the front.

The front end of cam 60 carries, fixed thereto, a lever arm 64 extending upwardly and the upper end of which carries a finger 65 engaged in a vertical slot 66 provided in head 59. The whole is arranged in such manner that, on every cycle of displacement of breechblock body 18, said head 59 is given a transverse reciprocating movement of the desired amplitude to ensure a good operation of the belt feed mechanism.

This mechanism is for instance made as it will be hereinafter described with reference to FIGS. 14 to 23 inclusive.

Control head 59 is fixed to the rear of a pawl carrying carriage 67 guided in frame 58 so as to have a reciprocating transverse sliding movement with respect to said frame.

For this purpose, the cover of frame 58 carries two guiding rollers 68 (FIGS. 14, 15, 16) engaged respectively in two transverse slideways 69 provided in carriage 67. Carriage 67 carries, pivotally mounted above a common axis 70, two feed pawls 71, 72 (FIGS. 16 and 17) adapted to act in the usual manner respectively upon the front end upon the rear of every cartridge case. Every time a cartridge is fired during the rearward movement of breechblock body 18, said pawls 71, 72, push the future cartridge from its last but one position 73a (FIG. 17, the breech being closed) to its introduction position 73c (FIGS. 18 and 22, the breech being open) whence, upon the return movement of breechblock body 18 toward the front, this cartridge will be pushed by said breechblock body 18 into the cartridge chamber of the gun. These two feed pawls 71, 72 are, in the usual manner, pushed in the downward direction by suitable springs.

On the other hand, frame 58 carries (FIGS. 18 and 19, 20 and 21) a pair of holding pawls 74 and 75 and a pair of abutment pawls 76, 77 adapted to act respectively upon the front end (FIGS 18 and 19) and upon the rear end (FIGS. 20 and 21) of every cartridge case as it will be explained hereinafter.

Holding pawls 74, 75 are pivoted to frame 58 about a common axis 78, located near the upstream end of said frame (i.e. the side through which the cartridges enter the belt feed mechanism). They are pushed downwardly in the usual maner by suitable springs. They prevent any backward movement of the cartridge having reached position 73a.

The abutment pawls 74, 77 are pivoted to frame 58 about respective axes 79 and 80. Axis 79 is located slightly upstream of axis 80 (with reference to the direction of movement of the cartridge belt). Both of these axes 79 and 80 are at a substantial distance upstream of axis 78, as clearly visible on FIGS. 15 and 18 to 21.

The whole of pawls 74, 75, 76 and 77 is arranged in such manner that, when said pawls occupy their lowermost positions under the effect of their respective springs, they prevent the cartridge following the cartridge to be fired from moving either frontwardly or rearwardly from its position 73a as above defined.

Figure 19:
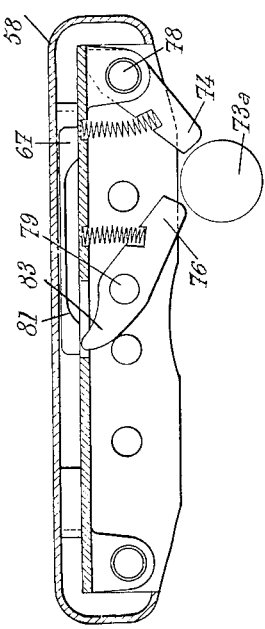
Figure 21:
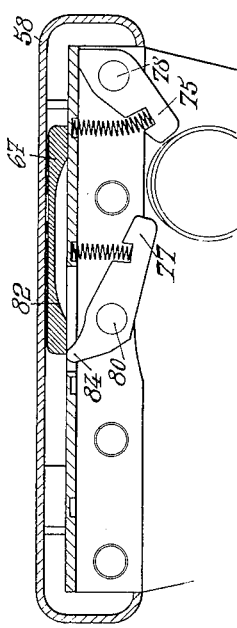

But this cartridge, which becomes the so-called "future" cartridge, must be capable of moving forward subsequently when it is pushed by feed pawls 71 and 72, for which purpose a device is provided for lifting the abutment pawls 76 and 77. For this purpose, carriage 67 is provided with two cams 81 and 82 capable, when breechblock 18 reaches the end of its frontward stroke (carriage 67 then reaching the end of its stroke in the upstream direction that is to say toward the right hand side of FIGS. 16 to 23 and toward the top of FIG. 15), of lifting, as shown by FIGS. 19 and 21, pawls 76 and 77 while lowering fingers 83, 84 rigid with said pawls 76 and 77 respectively. Thus when breechblock body 18 starts back toward the rear, feed pawls, 71, 72 can freely push the future cartridge from position 73a toward positions 73b and 73c. Finally frame 58 further carries (FIGS.

Figure 22:
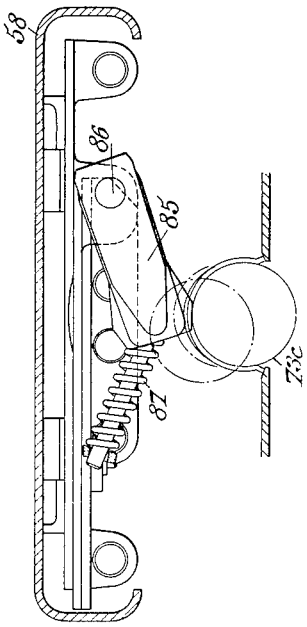
FIGS. 22 and 23 are cross-sections of this belt feed mechanism on the line XXII—XXII of FIG. 14 corresponding to two different positions of this mechanism, respectively.
Figure 23:
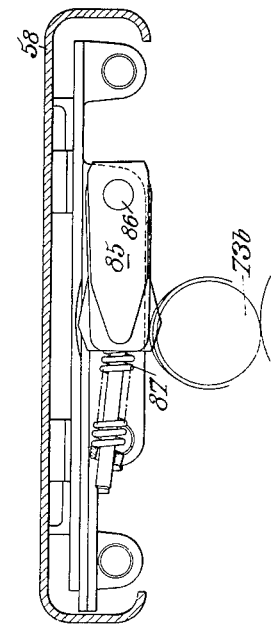
Figure 20:
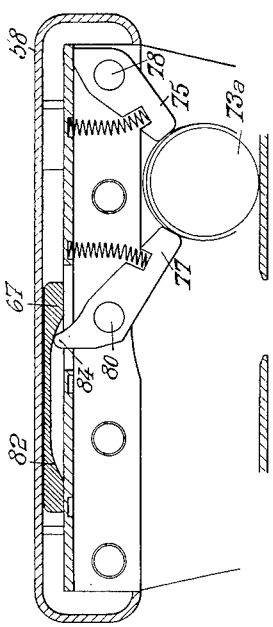
FIGS. 20 and 21 are cross-sections of this belt feed mechanism on the line XX—XX of FIG. 14, corresponding to two different positions of this mechanism respectively.

22 and 23) a deflector 85, pivoted to said frame about an axis 86 and capable of urging the future cartridge downwardly from position 73b, which it may temporarily occupy before breechblock body 18 has finished its rearward stroke (FIG. 23), into position 73c, lower and more inclined toward the front, which it must occupy at the end of the rearward stroke of breechblock body 18 (FIG. 22). This deflector is pushed downwardly by two springs 87.

It will be understood that abutment pawls 76 and 77 stop the cartridge following the cartridge to be fired imperatively and temporarily at the end of the feed stroke (corresponding to the rearward stroke of breechblock body 18) and during the beginning of the return stroke of carriage 67 (frontward stroke of breechblock body 18). Said cartridge to be fired, in its position 73c, is thus protected against the disturbing influences due to the movement of the belt. But during the portion of the feed cycle for which feed pawls 71, 72 push the cartridge which has become the future cartridge from position 73a and toward positions 73b and 73c, abutment pawls 76, 77 are lifted and permit the displacement of this cartridge.

The sear mechanism of the gun comprises two sears 90 having front hooking heads intended to cooperate with the catches 37 of breechblock body 18. These sears 90 are pivoted about respective transverse pins mounted in lugs 88 carried by a sleeve 89 on the right and on the left respectively thereof, this sleeve 89 surrounding the rear of return spring 22.

Sleeve 89 is provided at its rear end with an inward flange 91 engaged against the periphery of a disc 92 mounted on rod 46 between spring 47 and the end wall 93 of back block 23. Thus, when breechblock 18 is caught by sears 90, the shock is absorbed by spring 47.

Sleeve 89 is rotatable with respect to said wall 93 about the axis of rod 46. Means are provided for preventing sleeve 89, and the sears 90 carried by it, from rotating about said axis with respect to casing 1 when the back block 23 is rotated so as to fix it to casing 1 by the bayonet fixation device. Said means consist of slideways 94 fixed to casing 1 and in which at least one of the lugs 88 which carry sears 90 is slidably fitted. Each of these sears 90 tends to be pushed toward its hooking position by a spring 95 acting upon the rear part 96 of said sear 90.

The mechanism for moving the sear heads away from each other in order to start firing and for bringing said heads toward each other in order to stop firing is housed inside back block 23 and made as follows.

In order to release breechblock body 18 when it is held by sears 90, a wedge 97 is provided to move the rear part 96 of each sear 90 toward the middle longitudinal plane of the gun. The two wedges 97 are carried respectively by the lower ends of the branches of a piece 98 in the form of an inverted U surrounding sleeve 89 and located above it. This piece 98 is pivoted in back block 23 about a horizontal pin 99 extending above said sleeve 89. Piece 98 is urged by springs 100 toward the position where wedges 97 are not acting on the sear parts 96.

This piece 98 is acted upon, near the end of each of its branches, through pins 101 located approximately at the level of wedges 97, by a differential lever 102 also in the form of an inverted U surrounding sleeve 89 at the rear of piece 98.

This lever 102 is urged rearwardly through pins 101 by the effort exerted by springs 100. The top portion of this lever 102 is held by a catch 103 which will be more explicitly described hereinafter.

The lower end of each of the branches of said lever 102, located below the level of pins 101, is connected through a link 104 to the upper end of a short control lever 105 fixed on a tubular transverse shaft 106 pivoted about its axis with respect to the wall of back block 23, said shaft 106 being located below sleeve 89.

Inside this tubular shaft 106 and coaxially therewith, there is mounted a control shaft 107 carrying, rigid therewith, an actuating arm 108. Shafts 106 and 107 can rotate with each other through a limited angle of for instance 60°. Thus the movements of rotation of control shaft 107, imparted thereto by means of control arm 108, are transmitted to tubular shaft 106 with a lost motion or angular play, of 60°.

The system is arranged in such manner that, when the gunner rotates shaft 107, through arm 108, in the anticlockwise direction (with reference to FIGS. 2b and 4b), and after the angular play of 60° between this shaft and shaft 106 has been absorbed, lever 102, stopped at its upper end by catch 103, is caused to pivot toward the front, thus pushing wedges 97 frontwardly whereas piece 98 pivots about pin 99.

On the other hand, during these displacements, links 104 which, initially, were substantially perpendicular to the direction of control level 105 (as visible on FIGURE 4b) move in such manner as first to come into line with this lever and then to go beyond this position when shaft 106 is at the end of its rotation movement.

It will be understood that in this manner wedges 97 are blocked into the position where they keep the sear heads at the maximum distance from the catches 37 of breechblock body 18. Of course, when arm 108 is moved back, first nothing takes place because the angular play above referred to changes of direction; then, when links 104 have been moved past the position where they are in line with lever 105, wedges 97 are suddenly moved in the rearward direction, thus enabling the sears to come back into hooking position.

In the above description of the mechanism to control firing, it has been supposed that the upper end of lever 102 is held in position by a catch 103. As a matter of fact, this part of lever 102 might be pivoted to the wall of back block 23.

But if there is provided a catch 103 which is retracted when the last cartridge of the belt has left said position 73a, then firing is automatically stopped after the last cartridge has been fired, breechblock body 18 remaining held in its rearmost position. This is due to the fact that the upper end of lever 102 is then allowed to move rearwardly, together with pins 101 and wedges 97, which are pushed in the rearward direction by springs 100. Sears 90 then come back into hooking position and hold breechblock body 18 in its rear position after the last cartridge has been fired. It is thus possible to resume firing immediately by introducing a fresh cartridge belt into the belt feed mechanism without having to cock the gun before firing.

The device for retracting catch 103 at the desired time may be made as shown by FIGURES 14 and 25 to 31.

At the rear of the frame 58 of the belt feed mechanism, there is provided a longitudinal spindle 109 located in the vertical plane of symmetry of the gun. On this spindle is pivoted a rocking member 110 capable of moving from a horizontal position (FIGS. 25 and 26) to an inclined position (FIGS. 27 and 28) toward which it is pushed back by a spring 111.

This rocking member is kept in its horizontal position by the cartridges which are passing under the right hand branch of said member (as shown in FIGS. 25 to 28). Therefore this member 110 cannot come into its inclined position as long as there is a cartridge in position 73a.

On the other hand, above said rocking member 110 a strip 112 is moving with a reciprocating movement (with one reciprocation for every cartridge that is fired). This strip 112 is fixed to the carriage 67 of the belt feed mechanism and it passes from a position illustrated by FIGS. 25 and 27 where it is above the right hand branch of member 110 to a position illustrated by FIGS.

26 and 28, where it is located above the left hand branch of said member 110.

When strip 112 is in the position of FIGS. 26 and 28, it passes above a stop lever 113 pivoted to the left hand branch of member 110 about an axis 114. This lever 113 is resiliently held by a spring 115 toward a position where it is perpendicular to the general direction of said branch of member 110, being then applied against an abutment 116 (FIG. 23) which prevents the top of said lever from moving nearer to the spindle 109 of rocking member 110.

Now, when the last cartridge of the belt passes from its position 73a (FIG. 25) to its position 73b to move down subsequently into position 73c (FIG. 26) under the effect of deflector 85, rocking member 110 might come into its inclined position, if it were not maintained in the horizontal position by lever 113 bearing against strip 112 which is then located immediately above said lever (FIG. 26).

The breech is then closed, pushing the last cartridge of the belt into the cartridge chamber of the barrel, but at the same time, strip 112 moves toward the right so that rocking member 110 then comes into inclined position (FIG. 27).

When, subsequently, breechblock body 18 moves toward the rear under the effect of the recoil due to the firing of the last cartridge, strip 112 can move back towards the left (FIG. 28) because lever 113 is now retracted by having pivoted toward the left.

Rocking member 110 carries in its middle part an abutment finger 117 extending in the downward direction, this finger preventing a push-piece 118 from moving frontwardly as long as rocking member 110 is in horizontal position, thus permitting frontward movement of said push piece 118, under the effect of a resilient thrust, when rocking member is in inclined position (FIGS. 27 and 28).

This push-piece 118 is connected to the sear control system in such manner that, as long as this push-piece is kept in rear position, firing can take place normally, whereas it is stopped, while the breech remains open, as soon as this push-piece 118 is allowed to move frontwardly.

For this purpose, as shown by the drawing, push-piece 118 consists of a rod extending axially throughout cam 60, this rod being pushed toward the rear by at least one spring 119 and extending rearwardly of cam 60 so that, after having passed above piece 98 it acts, through its rear edge, as an abutment cooperating with a release lever 120 pivotally mounted on pin 99 and which carries the above mentioned catch 103.

The system is arranged in such manner that, when rocking member 110 comes into its inclined position and therefore permits a frontward displacement of push-piece 118, this push-piece can be retracted frontwardly by said release lever 120 which, up to then, was maintained by said push-piece 118 in a position such that catch 103 formed an abutment for the upper part of lever 102, as above indicated.

This release lever 120 can then swing frontwardly under the effect of springs 100 acting through piece 98 and catch 103 releases the upper part of lever 102, which then moves toward the rear, together with wedges 97, so that sears 90 are free to return into their active positions. Said sears then catch and hold breechblock body 18 in its rear position.

Rocking member 110 then remains in its inclined position at least until push-piece 118 has been returned toward the rear, which takes place under the action of springs 119 (FIG. 2b) but only when the gunner releases the trigger. A fresh cartridge belt can then be introduced and rocking member 110 is brought back into horizontal position by the cartridges of this belt, the first of these cartridges being brought into position 73c.

It should be understood that the device consisting of rocking member 110 and the elements that cooperate therewith may be used either with a gun which is fed from the right or with a gun which is fed from the left (the gun shown by the drawing is fed from the right). It suffices, to pass from one case to the other, to interchange spring 111 and stop lever 113.

This machine gun is very simple of construction and very compact, all of the parts being very well protected against external agents.

Another advantage is that the gun is of relatively light weight and is relatively cheap to manufacture since all the parts thereof may be manufactured by simple machining operations.

In a general manner the above description has been given merely by way of example and should not be considered as limiting the scope of the invention as indicated in the appended claims.

What is claimed is:

1. An automatic firearm which comprises, in combination, a cylindrical fixed casing, of circular cross-section, a barrel operatively connected with said casing coaxially therewith, a breech case slidably mounted in said casing for reciprocating longitudinal translatory movement with respect thereto, said casing being provided in its upper part with an opening for introduction of cartridges, a cartridge feed mechanism carried by said casing above said opening, said casing being provided in its lower part with a passage for ejection of empty cartridge cases, longitudinal slideways carried by said casing on the inside thereof, a breechblock body adapted to cooperate with said breech case and slidably guided in said slideways for reciprocating longitudinal movement in said casing, a return spring in said casing interposed between said breechblock body and the rear end of said casing, said breechblock body and said slideways being shaped and dimensioned to leave two elongated free spaces between said breechblock body and said casing, the first of said spaces being on one side of said breechblock body and the second one on the other side of said breechblock body, a device operatively connected with said breechblock body and with said cartridge feed mechanism for operating said mechanism in response to the displacements of said breechblock body in said casing, said device being housed in the first of said spaces, and a device operatively connected with said breechblock body to bring it into position for cocking the firearm, said last mentioned device being housed in the second of said spaces.

2. An automatic firearm according to claim 1 wherein the device for operating the cartridge feed mechanism comprises a cam journalled in said casing about an axis parallel to the casing axis and of elongated shape in the direction of said axis, and means carried by said breechblock body for acting on said cam to rotate it in response to the longitudinal reciprocating movement of said breechblock body in said casing.

3. An automatic firearm according to claim 1 wherein the device for cocking the firearm comprises an endless chain having two parallel portions respectively located along the sides of said ejection passage.

4. An automatic firearm according to claim 1 wherein the device for cocking the firearm comprises a removable frame provided with an elongated slot, said frame being fixed to said casing in said second space so that said slot is opposite said ejection passage, sprocket wheels pivoted to said frame near the respective ends of said slot, said wheels being located in a plane parallel and close to the plane of said slot and having a diameter a little greater than the width of said slot, and an endless chain passing round said two sprocket wheels.

5. An automatic firearm according to claim 1 wherein said return spring is a helical spring extending coaxially in said casing, with an annular space left between said spring and the inner wall of said casing, said firearm comprising two sears located in said annular space on opposite sides of said spring, respectively, for holding said breechblock body in rear position in said casing, said sears being pivoted with respect to said casing about respective axes transverse to the casing axis, and means for controlling said sears, a portion of said means being housed in said annular space.

6. An automatic firearm according to claim 1 wherein said cartridge feed mechanism is a belt feed mechanism and the device for operating said belt feed mechanism comprises a cam journalled in said casing about an axis parallel to the casing axis, and of elongated shape in the direction of said axis, and means carried by said breechblock body for acting on said cam to rotate it in response to the longitudinal reciprocating movement of said breechblock body in said casing, a rod sliding coaxially in said cam and extending therethrough, said rod being operatively connected at one end with said belt feed mechanism and means cooperating with the other end of said rod for holding said breechblock body in its rear position in response to the firing of the last cartridge of a cartridge belt passed through said belt feed mechanism.

References Cited by the Examiner
UNITED STATES PATENTS

| 1,357,857 | 11/20 | Gabbett-Fairfax | 89—33 |
| 2,180,751 | 11/39 | Wagner | 89—1 |
| 2,406,461 | 8/46 | Hammell | 89—1 |
| 2,454,251 | 11/48 | Hamilton | 89—33 |

BENJAMIN A. BORCHELT, *Primary Examiner.*
SAMUEL FEINBERG, *Examiner.*